United States Patent
Cornell et al.

(10) Patent No.: US 11,937,692 B2
(45) Date of Patent: Mar. 26, 2024

(54) UNDER-SINK CABINET WITH MOVABLE BOTTOM PANEL

(71) Applicant: Richard D. Cornell, Tn, TN (US)

(72) Inventors: Richard D. Cornell, Knoxville, TN (US); Seanan Royce Burke, Knoxville, TN (US)

(73) Assignee: Richard D. Cornell, Knoxville, TN (US)

( * ) Notice: Subject to any disclaimer, the term of this patent is extended or adjusted under 35 U.S.C. 154(b) by 0 days.

(21) Appl. No.: 18/104,440

(22) Filed: Feb. 1, 2023

(65) Prior Publication Data

US 2023/0240441 A1 Aug. 3, 2023

Related U.S. Application Data

(63) Continuation of application No. 17/710,113, filed on Mar. 31, 2022, now abandoned.

(60) Provisional application No. 63/188,768, filed on May 14, 2021.

(51) Int. Cl.
| | | |
|---|---|---|
| *A47B 49/00* | (2006.01) | |
| *A47B 46/00* | (2006.01) | |
| *A47B 77/02* | (2006.01) | |
| *A47B 77/06* | (2006.01) | |
| *A47B 87/00* | (2006.01) | |
| *B60B 33/00* | (2006.01) | |

(52) U.S. Cl.
CPC ............ *A47B 49/002* (2013.01); *A47B 46/00* (2013.01); *A47B 49/008* (2013.01); *A47B 77/02* (2013.01); *A47B 77/06* (2013.01); *A47B 87/007* (2013.01); *B60B 33/0002* (2013.01); *A47B 2220/0052* (2013.01); *A47B 2220/0069* (2013.01)

(58) Field of Classification Search
CPC ............ A47B 77/06; A47B 2220/0052; A47B 2220/0069
USPC ........................... 4/630; 312/204, 235.1, 311
See application file for complete search history.

(56) References Cited

U.S. PATENT DOCUMENTS

| | | | | |
|---|---|---|---|---|
| 1,925,371 | A * | 9/1933 | Charter | F25D 25/02 126/339 |
| 4,026,616 | A | 5/1977 | Kuehl | |
| 4,274,685 | A * | 6/1981 | Bradshaw | A47B 11/00 312/122 |
| 4,729,612 | A * | 3/1988 | Stone | E06B 3/5045 312/109 |
| 4,799,743 | A * | 1/1989 | Kikuchi | A47B 77/02 312/196 |
| 4,861,122 | A | 8/1989 | Newhouse | |
| 4,974,912 | A * | 12/1990 | Rask | E06B 3/5045 312/331 |
| 5,046,790 | A | 9/1991 | Onomoto | |

(Continued)

*Primary Examiner* — Janet M Wilkens
*Assistant Examiner* — Timothy M Ayres
(74) *Attorney, Agent, or Firm* — Blanchard Horton PLLC

(57) ABSTRACT

A cabinet system arranged to allow access to floor space underneath, the system including two side walls having front and rear edges, at least one door arranged proximate the front edges of the side walls and configured to be openable to access an area between the side walls; and a bottom panel arranged between the two side walls and configured such that at least a portion of the bottom panel is selectively movable to at least partially expose a floor space extending back from the front edges of the side walls.

15 Claims, 13 Drawing Sheets

(56) References Cited

U.S. PATENT DOCUMENTS

| | | | |
|---|---|---|---|
| 5,664,852 A * | 9/1997 | Robinson | A47B 46/00 312/239 |
| 5,755,498 A * | 5/1998 | Cutler | A47B 46/00 312/278 |
| 6,364,441 B1 * | 4/2002 | Arnold | A47B 88/463 312/319.1 |
| 6,364,444 B1 | 4/2002 | Arnold | |
| 6,371,584 B1 | 4/2002 | Alreck | |
| 6,994,410 B2 * | 2/2006 | Hogan | E05D 15/58 312/110 |
| 7,090,318 B2 * | 8/2006 | Brown | E05D 15/58 312/110 |
| 9,584,471 B2 | 2/2017 | Beauregard | |
| 9,585,471 B2 * | 3/2017 | Beauregard | A47B 96/18 |
| 10,190,346 B2 * | 1/2019 | Clark | A47B 95/00 |
| 11,047,617 B1 * | 6/2021 | Bassler | F25D 25/02 |
| 11,064,802 B2 * | 7/2021 | Farjamrad | A47B 96/025 |
| 2007/0284981 A1 | 12/2007 | Cheng | |
| 2017/0151913 A1 | 6/2017 | Granzotto | |
| 2021/0059404 A1 * | 3/2021 | Farjamrad | A47B 43/00 |

\* cited by examiner

UNDER-SINK CABINET WITH MOVABLE BOTTOM PANEL

CROSS-REFERENCE TO RELATED APPLICATIONS

This application claims the benefit of U.S. Provisional Patent Application Ser. No. 63/188,768, filed on May 14, 2021, and is a Continuation of U.S. patent application Ser. No. 17/710,113, filed on Mar. 31, 2022, each of which is incorporated herein in their entirety by reference.

FIELD OF INVENTION

The present general inventive concept relates to cabinetry, and, more particularly, to a cabinet system arranged to allow selective movement of a bottom panel to expose part of the floor space under the cabinet system.

BACKGROUND

Cabinetry is one of the most important features of a home, and often commercial or industrial spaces, because of the unique combination of aesthetic and utilitarian features. Cabinets often provide a central decorative theme in residential kitchens and can provide a host of different storage options such as drawers, shelves, racks, and so on. Countertops are typically installed over base cabinets, and these counter tops often become one of the main areas on which kitchen work takes place. Conventional base cabinets are arranged with a generally flat front area that is slightly offset from the lip of the countertop, with a bottom recess ending in a toe kick panel to accommodate the feet of a person so that person can get close to the countertop for a comfortable work position. As such, however, it is very difficult for persons using a wheelchair to access the countertop in a way that facilitates easy and convenient use of the countertop, as the front of the wheelchair is stopped by the front area of the base cabinet. This is especially problematic in the case of an under-sink cabinet, as the person using a wheelchair may not be able to even reach the bottom of the sink, let alone get close enough to wash dishes or conduct other sink related activities in any type of comfort. The conventional arrangement of the under-sink base cabinet also presents problems to people not using wheelchairs, as plumbing problems often occur, and the space inside the under-sink cabinetry about the plumbing works is extremely limited. Thus, it would be desirable to have under-sink or other base cabinetry that would allow enhanced access space in which a user could position portions of his or her body to perform various operations.

BRIEF SUMMARY

According to various example embodiments of the present general inventive concept, an under-sink or other such base cabinet system is provided that includes a bottom panel that is retractable to expose floor space underneath that may be substantially level to the floor space outside of the cabinet, so that users can take advantage of increased access to the area under the counter of the base cabinet. One advantage of such a system is the increased floor access that allows a person using a wheelchair to move their legs partially inside the cabinet space to more easily and conveniently access the sink or other upper counter space.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing a cabinet system arranged to allow access to floor space underneath, the system including two side walls having front and rear edges, at least one door arranged proximate the front edges of the side walls and configured to be openable to access an area between the side walls; and a bottom panel arranged between the two side walls and configured such that at least a portion of the bottom panel is selectively movable to at least partially expose a floor space extending back from the front edges of the side walls.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIGS. 9A-B illustrate perspective and front views of a cabinet system according to a further example embodiment of the present general inventive concept.

DETAILED DESCRIPTION

Figure 1:
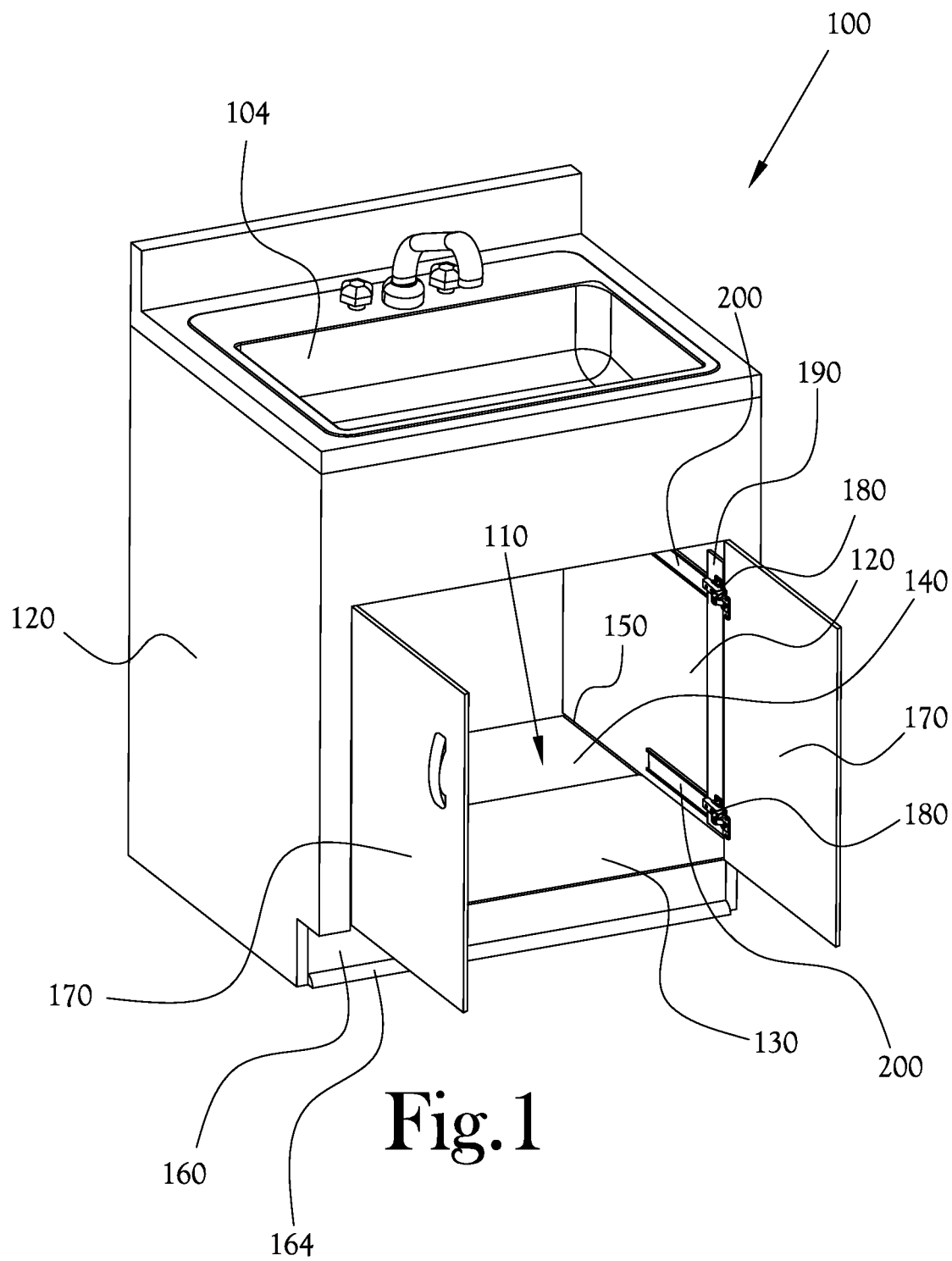
FIGS. 1-3 illustrate perspective views of a cabinet system configured to allow access to floor space underneath according to an example embodiment of the present general inventive concept.

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modifications, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

According to various example embodiments of the present general inventive concept, an under-sink or other such base cabinet system is provided that includes a bottom panel that is retractable to expose floor space underneath that may be substantially level to the floor space outside of the cabinet, so that users can take advantage of increased access to the area under the counter of the base cabinet. With such a system, a portion of the floor under a bottom panel otherwise used for storage may be selectively uncovered to allow a person using a wheelchair to move their legs partially inside the cabinet space to more easily and conveniently access the sink or other upper counter space, or to allow a person working on plumbing or other maintenance repair to have extra space in which to rest and maneuver.

Various example embodiments described herein specifically address an under-sink cabinet system, but it is understood that the system can be used in other base cabinet configurations without departing from the scope of the present general inventive concept. Thus, while wheelchair access and other activities are provided to the under-sink or under counter cabinet, when the doors are closed and the bottom panel is not retracted, the convertible sink base has the appearance of a conventional sink base. The portion of the bottom panel of the cabinet that is retractable can be used for general storage just as in a conventional base cabinet, and in some embodiments the stored items do not even need to be moved, but rather can stay on the retractable panel while it is being retracted. It is noted that under-sink plumbing works have been omitted from the drawings herein for the sake of clarity of the illustrated features of the various example embodiments of the cabinet system described herein. Also, while the illustrated embodiments are configured with under-sink plumbing works (drain, water supply, etc.) that exit through a back panel of the cabinetry, various example embodiments of the present general inventive concept may provide bottom panels with one or more cutouts or other such openings to accommodate plumbing works that go through the bottom panel of the cabinet system.

Figure 2:
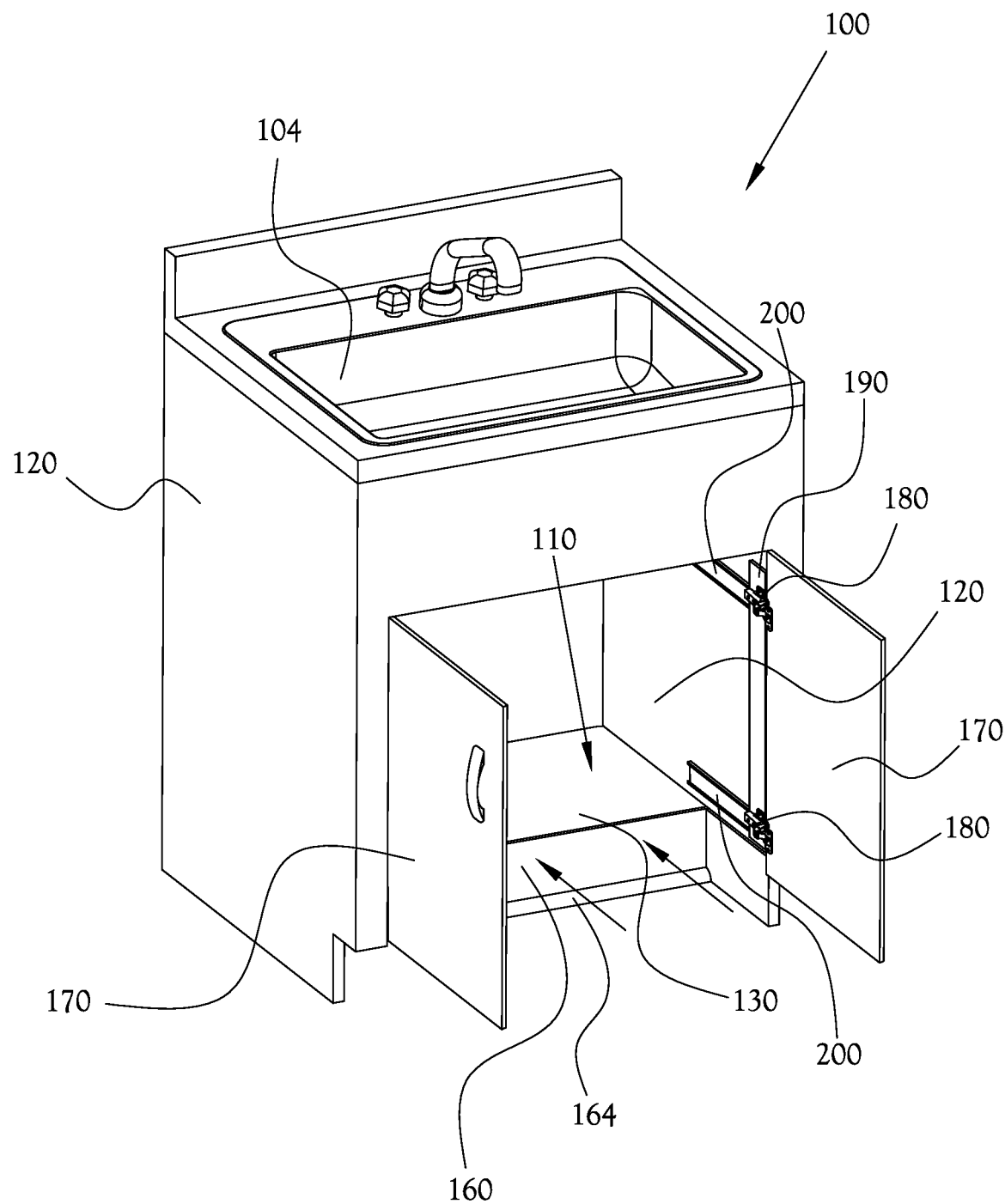
Figure 3:
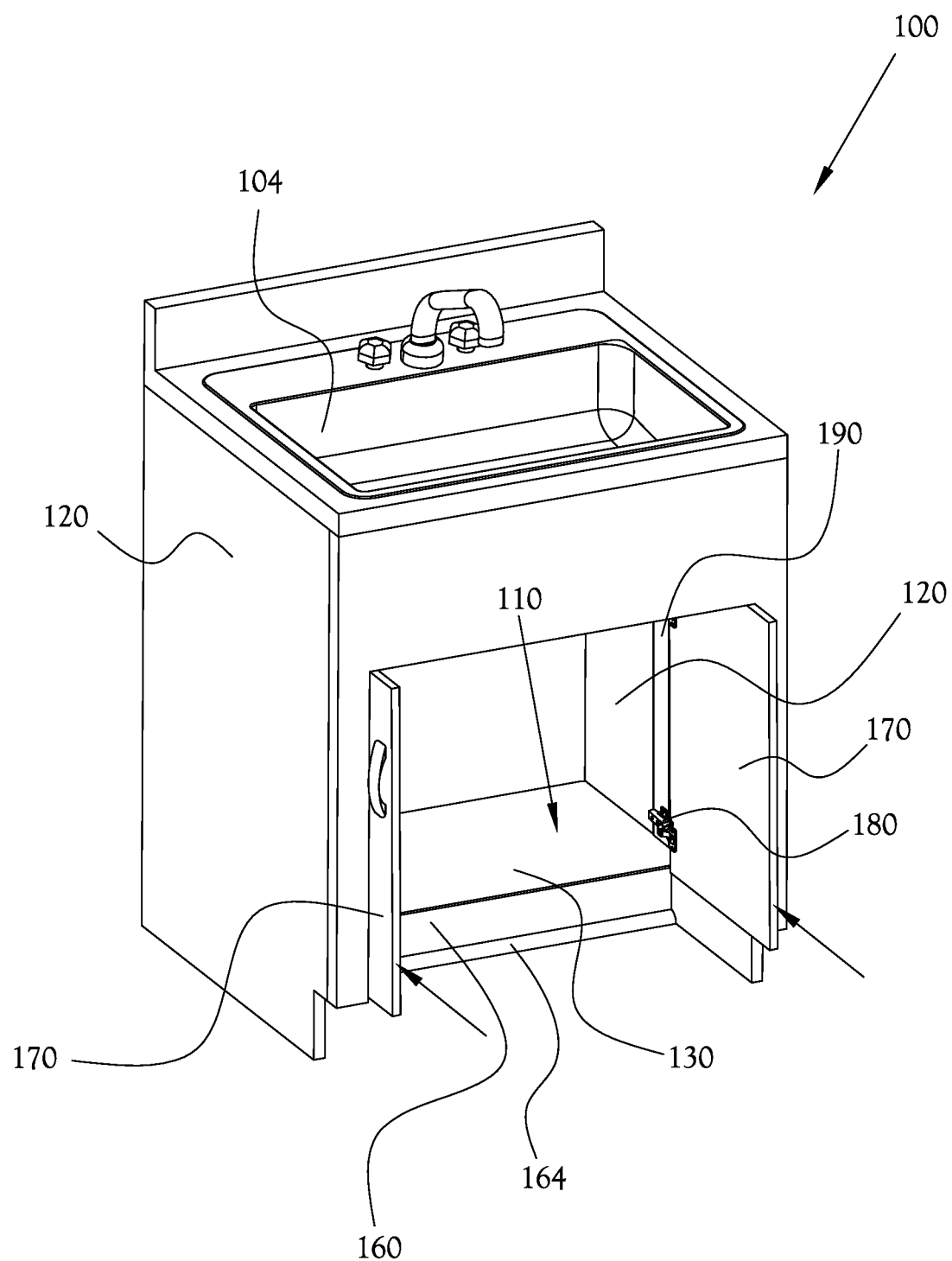

FIGS. 1-3 illustrate perspective views of a cabinet system configured to allow access to floor space underneath according to an example embodiment of the present general inventive concept. As illustrated in FIGS. 1-3 an under-sink cabinet system 100 is configured in appearance in much the same manner as a conventional under-sink arrangement, with a sink 104 mounted in the countertop, and a bottom panel 110 extending between two side walls 120 proximate a bottom of the side walls 120. Although the bottom panel may be separated into different sections in various example embodiments described herein, with one section being located slightly above the other in some embodiments, it may still be referred to generally as a bottom panel since both sections cover the floor surface underneath the cabinet system when no section is retracted or otherwise removed.

The side walls 120 each have a front edge and a rear edge, and two cabinet doors 170 are mounted at the front of the cabinet system 100 proximate the front edges of the side walls 120. In this example embodiment, the bottom panel 110, which may be referred to as a cabinet floor, as opposed to the actual floor surface underneath the cabinets, is separated into a front member or portion 130 and a rear member or portion 140. The front portion 130 is configured to be selectively retracted to expose a portion of the floor space underneath the bottom panel 110 that extends back from the front edges of the side walls 120. A groove 150 is formed on the inner surface of each of the side walls 120, and the side edges of the front portion 130 of the bottom panel 110 are configured to extend into the grooves 150 such that the front portion 130 is slidable back and forth along the grooves 150. As illustrated in FIG. 2, the front portion 130 is slidable back over the top of the rear portion 140 of the bottom panel 110, due to the grooves 150 being formed above the rear portion 140.

The cabinet system 100 of this example embodiment includes a toe kick panel 160 mounted to the front portion 130, with a shoe molding strip 164 arranged on a bottom front edge of the toe kick panel 160, such that the toe kick panel 160 moves along with the front portion 130 of the bottom panel 110 when it is being retracted and returned to the extended or non-retracted position covering the floor space underneath. Thus, as shown in FIG. 3, since the toe kick panel 160 moves back along with the front portion 130, the exposed floor space extending back from the front edges of the side walls 120 is generally even with the floor outside the cabinet system 100, such that a wheelchair user can conveniently move a portion of the wheelchair in under the sink 104 to more easily access the sink and tap or other such countertop space.

In various example embodiments the toe kick panel 160 may be coupled to the front portion 130 by hinges, such as friction hinges, to allow the toe kick panel 160 to rotate to a raised position when the front portion 130 is being retracted to avoid contact with the floor underneath, and can then be pushed back down to a substantially vertical state when the front portion 130 is returned to its initial position covering the floor surface extending back from the front edges of the side walls 120. In various example embodiments the shoe molding strip 164 may be coupled to the toe kick panel so as to be adjusted up and/or down to allow for easier movement of the retractable portion 130. In various example embodiments a pliable member, such as a squeegee blade, may be arranged on a bottom of the shoe molding strip 164 to at least partially seal any space between the floor and a bottom of the shoe molding strip 164.

As illustrated in FIGS. 1-2, the cabinet system 100 may include hinges 180 that couple the cabinet doors 170 to a sliding member 190 that is mounted on a plurality of runners or tracks 200 such that the doors 170 can be at least partially retracted inside the cabinet space to allow a more convenient approach to the space under the sink 104 by a person in a wheelchair. As illustrated in FIG. 2, the front portion 130 of the bottom panel 110 has been retracted back over the rear portion 140, moving the toe kick panel 160 along with it, and in FIG. 3 the open doors 170 are slid back along the tracks 200 to reduce hindrance to a wheelchair user wishing to access the sink 104.

Figure 4:
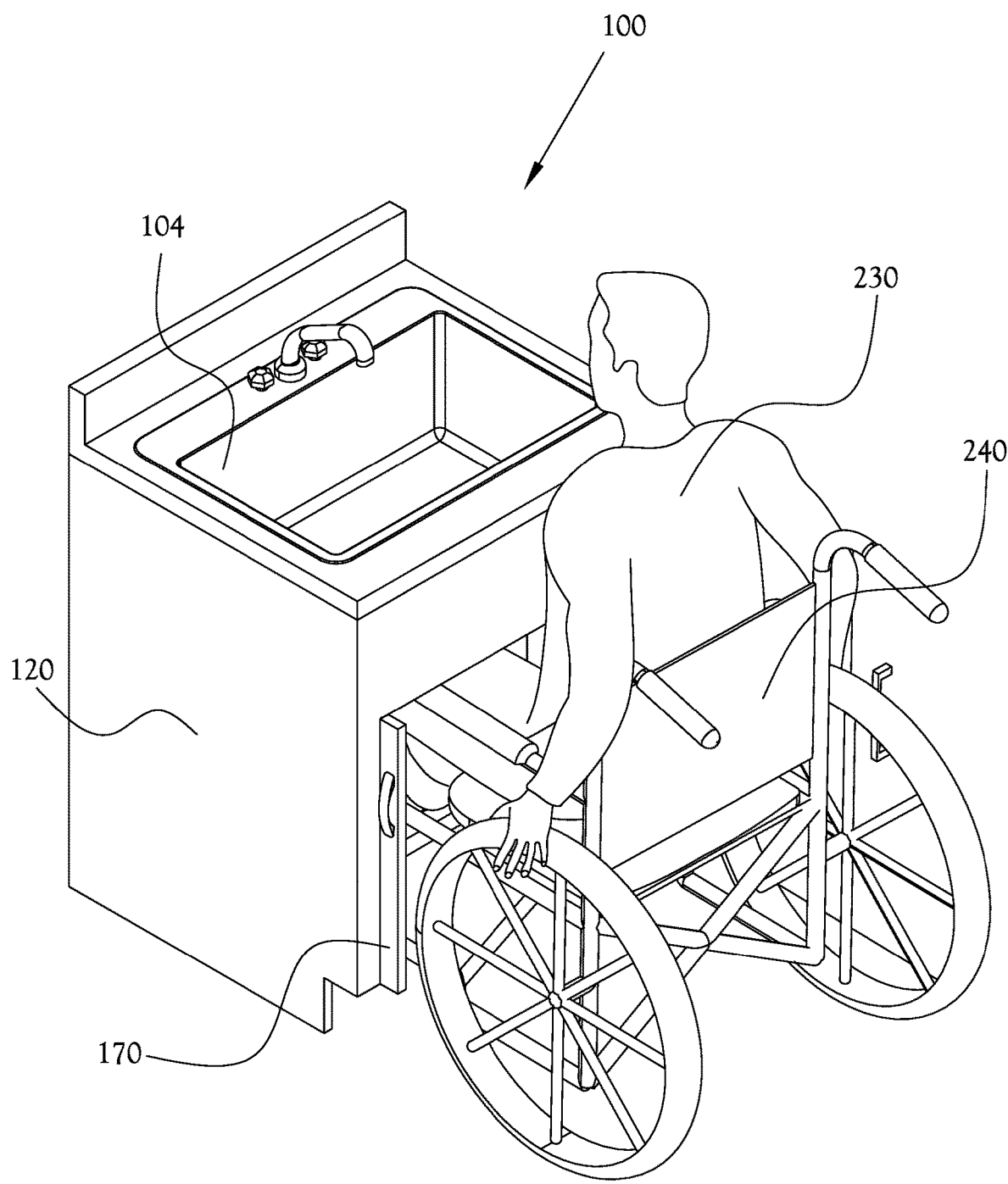
FIG. 4 illustrates a use of the cabinet system illustrated in FIGS. 1-3.

FIG. 4 illustrates a use of the cabinet system illustrated in FIGS. 1-3. As illustrated in FIG. 4, in this example embodiment a user 230 in a wheelchair 240 is able to maneuver a portion of his legs and the front of the wheelchair 240 inside the cabinet space and at least partially under the sink 104. Since the front portion 130 of the bottom panel 110 has been retracted, moving the toe kick panel 160 along with it, a significant part of the floor surface extending back from the front edges of the side walls 120 is exposed, and the user 230 is able to conveniently move the forward portion (and front wheels) of the wheelchair 240 inside the cabinet space behind a point at which the closed doors 170, toe kick panel 160, etc., would otherwise be. Since the user's body can be moved close to the front surface of the cabinet system 100, the user 230 can easily access the sink 104.

Figure 5A:
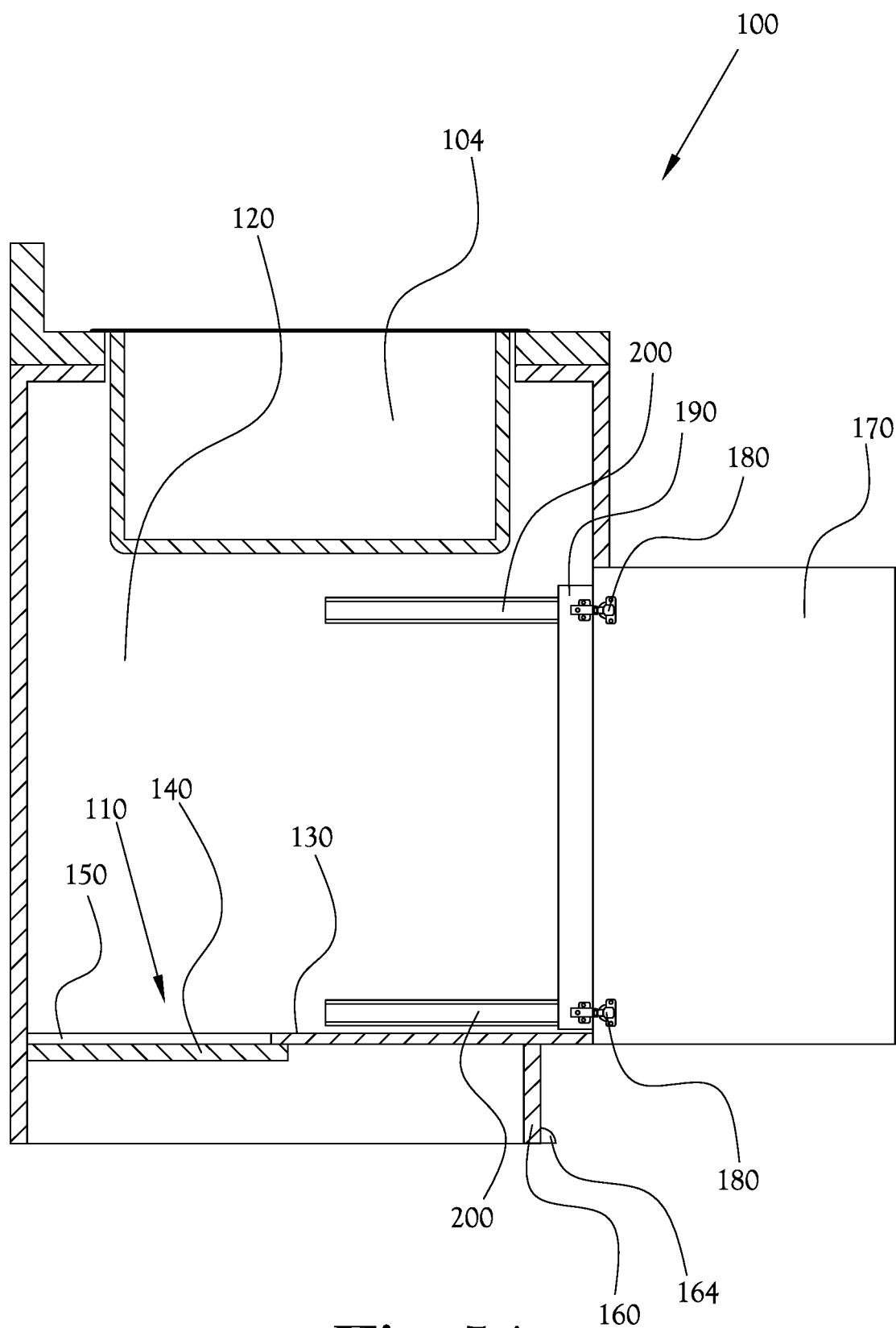
FIGS. 5A-B illustrate cross-sections of the cabinet system illustrated in FIGS. 1-3.
Figure 5B:
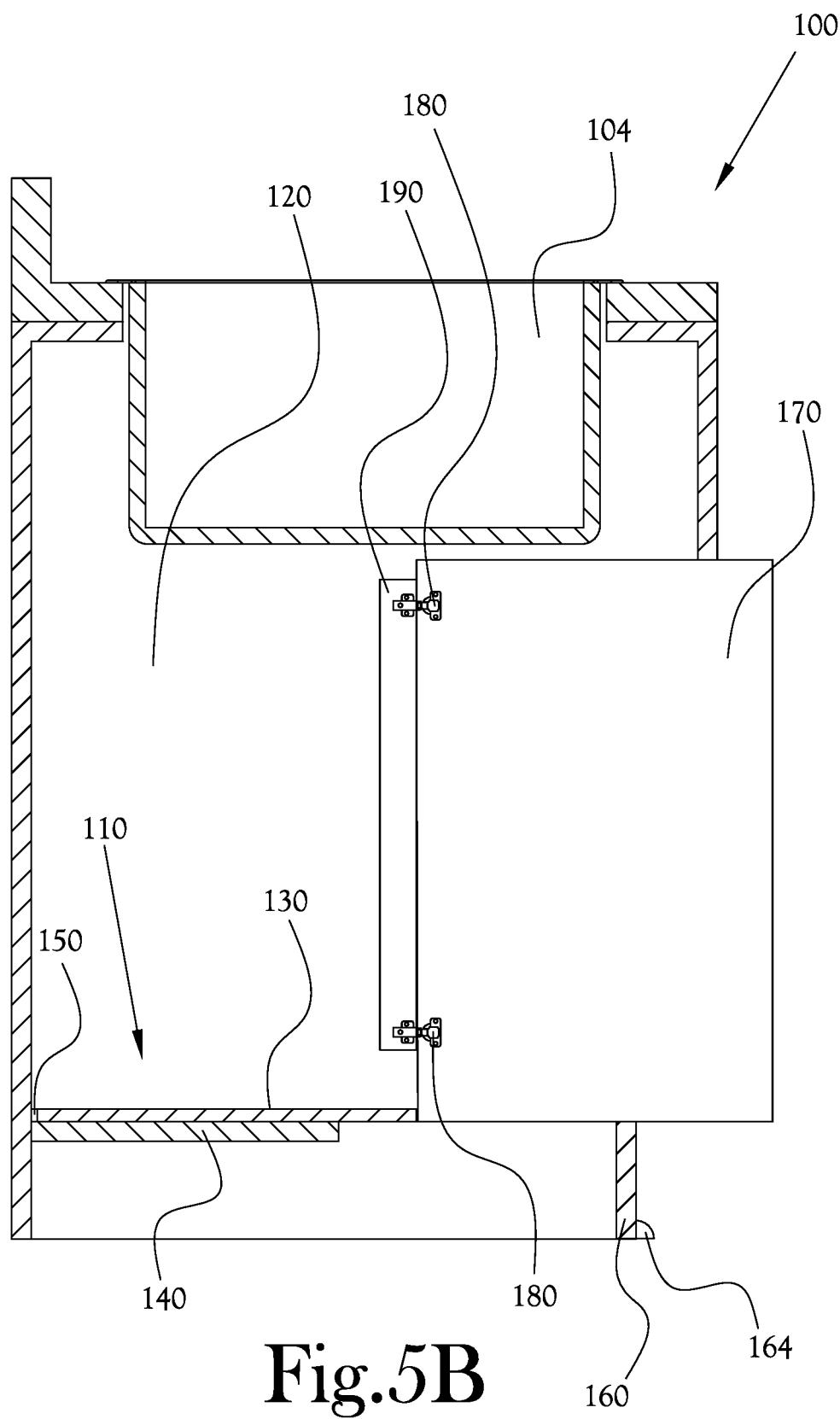

FIGS. 5A-B illustrate cross-sections of the cabinet system 100 illustrated in FIGS. 1-3. FIG. 5A illustrates the system 100 in a state before the front portion 130 of the bottom panel 110 is retracted, and FIG. 5B illustrates the system 100 in a state after the front portion 130 has been retracted. As illustrated, the front portion 130 slides via the groove 150 back into a position at least partially overlapping the rear portion 140 to expose the floor space extending back from the front edges of the side walls 120. The doors 170 have also been slid back in FIG. 5B, though various other example embodiments of the present general inventive concept may include doors that do not slide back in this fashion. In various example embodiments the front portion 130 of the bottom panel 110 may be retracted by simply pushing back on a forward part of the front portion 130 and extended back to the initial extended position by pulling on a forward part of the front portion 130. In example embodiments such as shown in FIGS. 5A-B, the bottoms of the doors 170 may contact the front portion when being slid backwards, and thus can be used to push the front portion 130 back. Various types of tools could be used to perform these actions. For example, a hidden recess, loop, or the like, could be configured on a bottom surface of the front portion 130 that extends out past the toe kick panel 160, so that an extended hook tool could be connected to the recess or loop to allow a user to move the retractable panel from a comfortable position. In other various example embodiments, an electrical actuator can be configured to perform bidirectional movement of the front portion 130 of the bottom panel 110. As such, the items that are stored on top of the front portion 130 of the bottom panel 110 do not have to be moved in order to retract that portion of the bottom panel to expose the floor underneath.

Figure 6A:
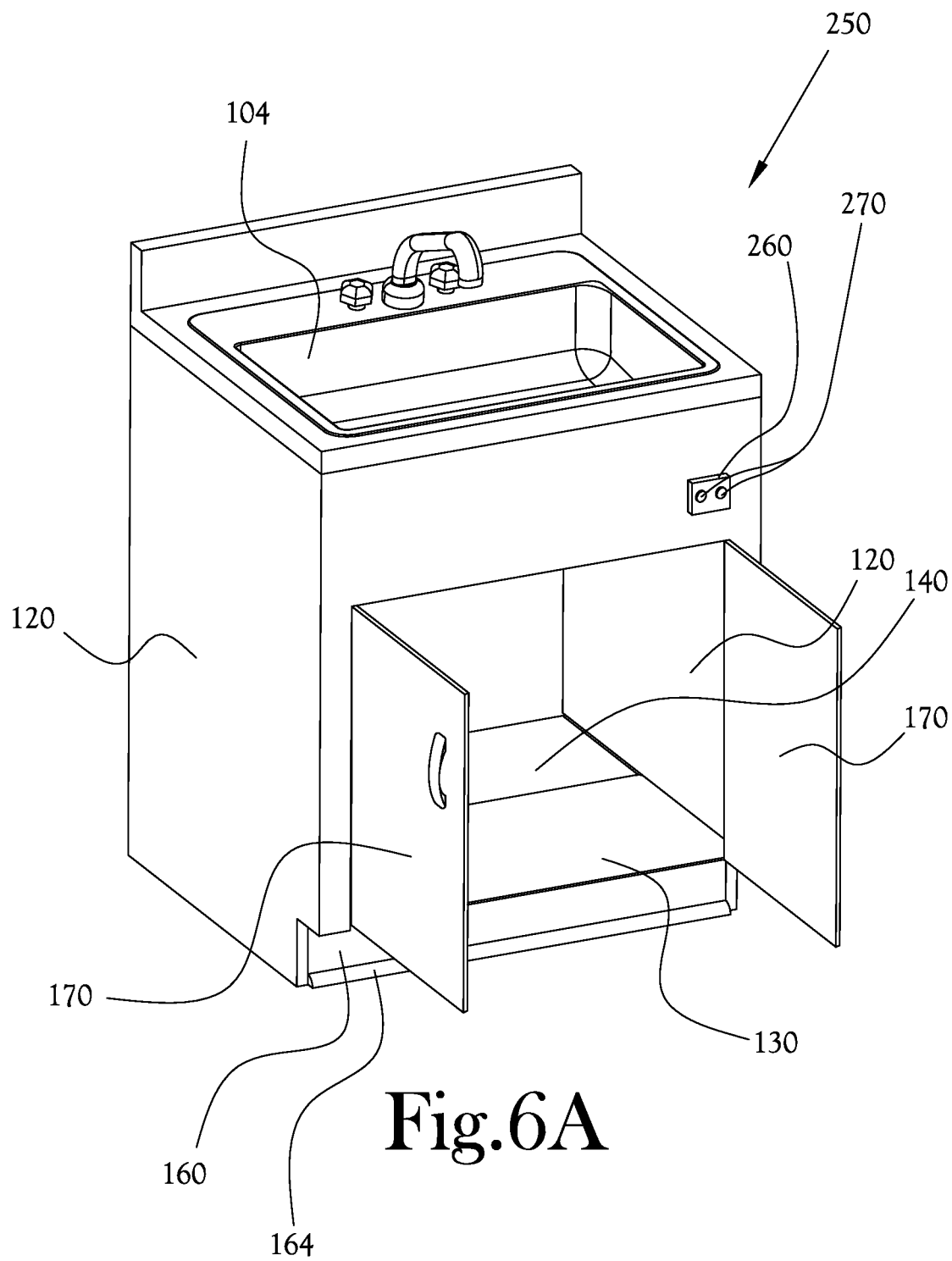
FIGS. 6A-D illustrate perspective and bottom views of a cabinet system according to another example embodiment of the present general inventive concept.

FIGS. 6A-D illustrate perspective and bottom views of a cabinet system according to another example embodiment of the present general inventive concept. In the example embodiment illustrated in FIGS. 6A-D, a cabinet system 250 is configured with bottom panel controls 260 to control an electrical actuator to selectively move the front portion 130 of the bottom panel 110 back and forward. As illustrated in FIG. 6A, the controls 260 may include two buttons 270, one for retracting the front portion 130 of the bottom panel 110, and one for returning the front portion 130 to a forwardly extended position. Various other example embodiments may provide a host of other different configurations, such as a single rocker switch, a screen with a graphical user interface (GUI), etc., and/or may communicate wirelessly with a smartphone or tablet to control the electrical actuator. In various example embodiments the controls may be located inside the cabinet space, such as on one of the side walls 120 near the front edge, so as to hide the controls.

Figure 6B:
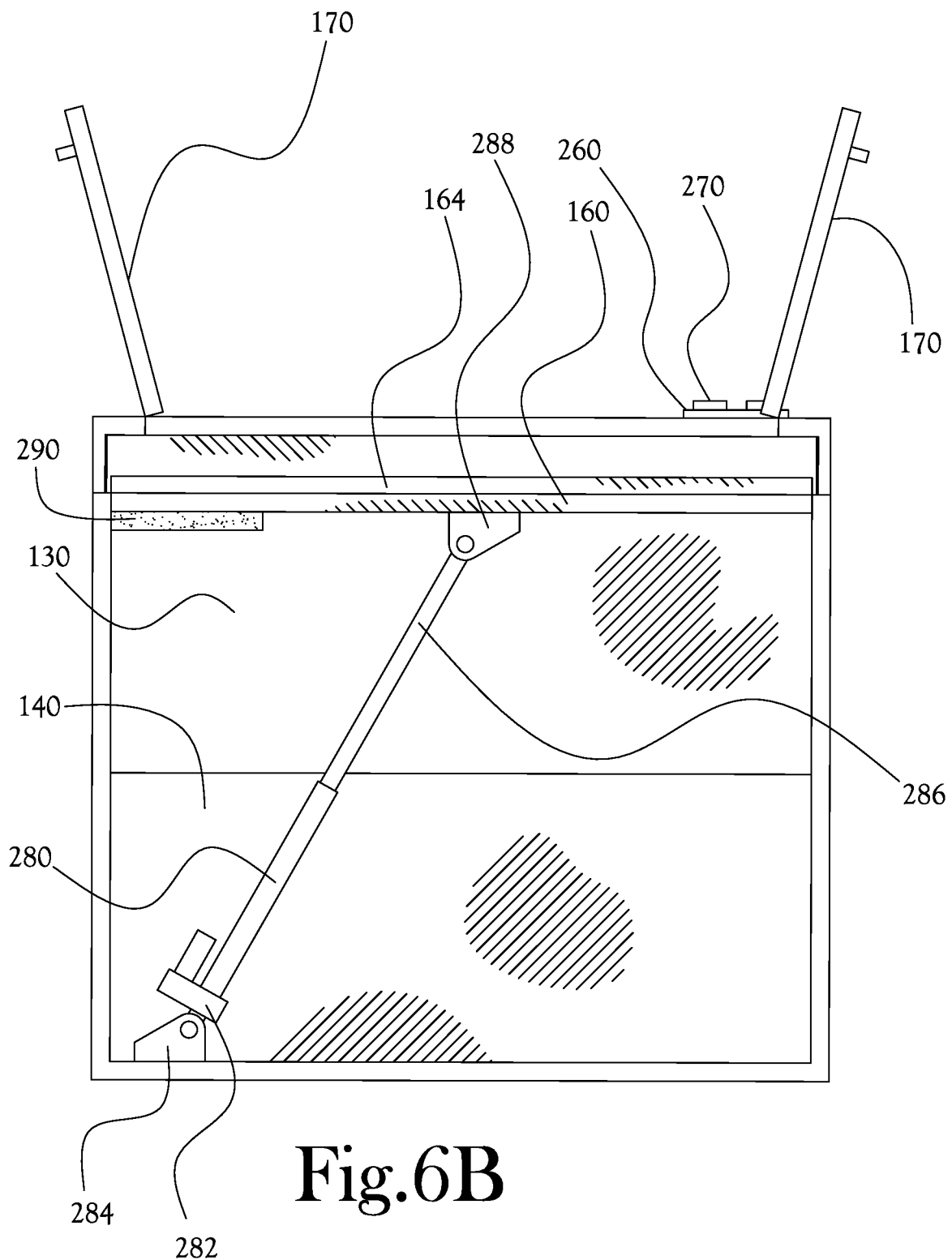
Figure 6C:
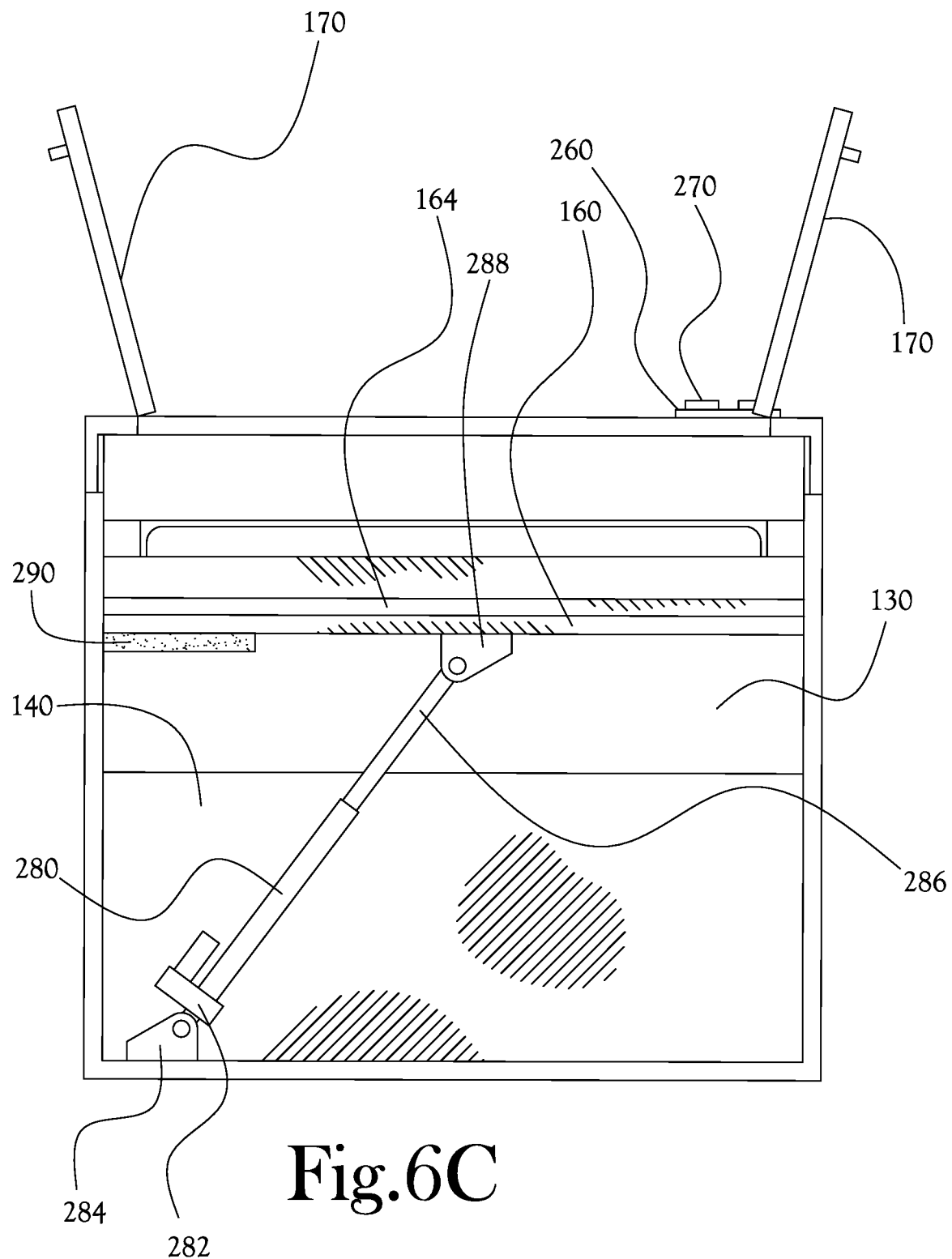
Figure 6D:
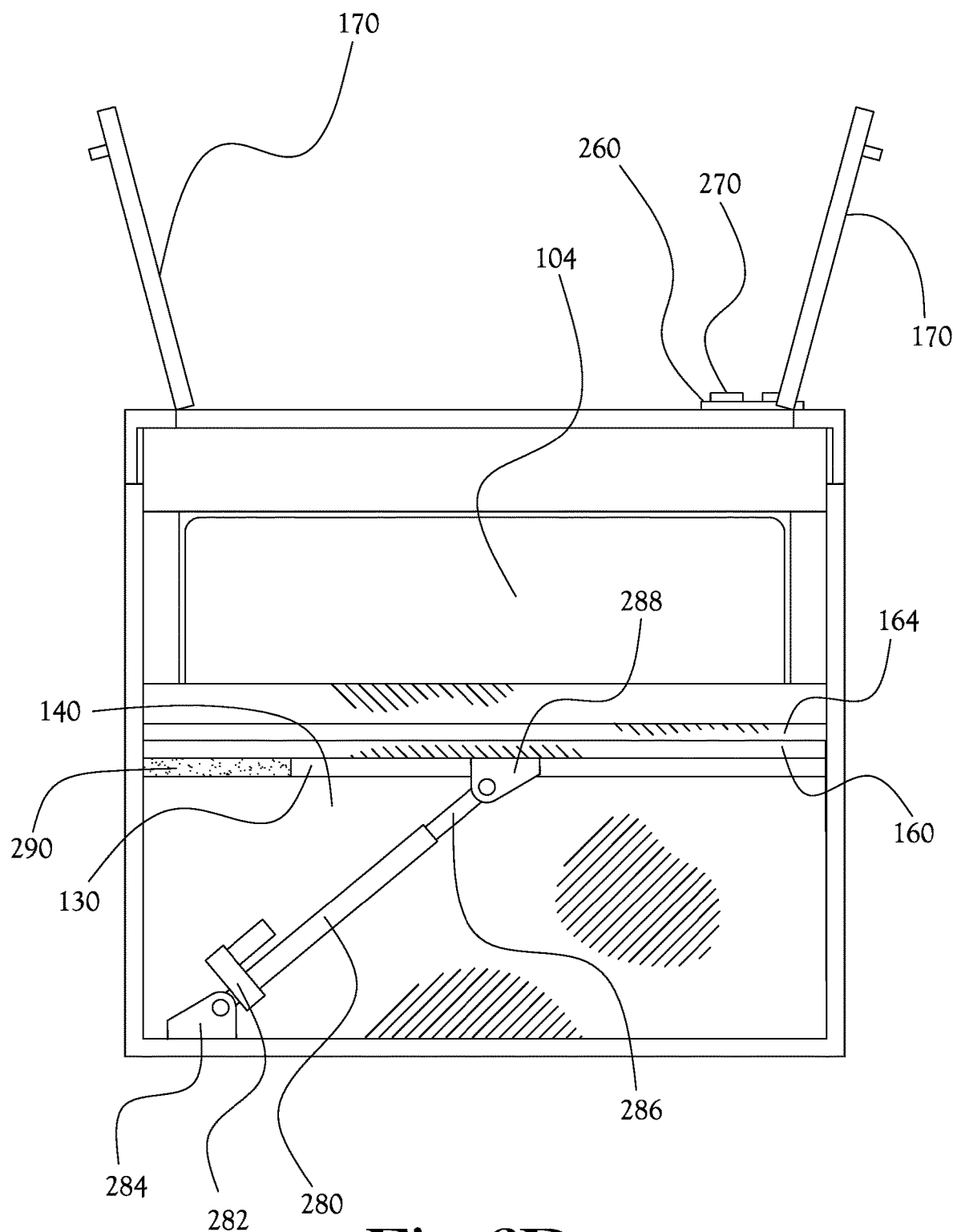

As illustrated in FIGS. 6B-D, a simple linear actuator 280 may be configured to move the front portion 130 of the bottom panel 110 forward and back. The linear actuator 280 of this example embodiment is configured such that a base end 282 is pivotally coupled to a back bracket 284 mounted to a back wall of the cabinet system 250, and a piston end 286 is pivotably coupled to a front bracket 288 mounted to a back surface of the toe kick panel 160. FIG. 6B illustrates the system 250 when the front portion 130 is extended fully forward for typical use. FIG. 6C illustrates the system after a user has used the bottom panel controls 260 to retract the front portion 130, and thus the front portion 130 and toe kick panel 160 are being moved toward the back of the cabinet space. FIG. 6D illustrates the front portion 130 of the bottom panel in a fully retracted position. In this example embodiment a spacer 290 is mounted on the back of the toe kick panel 160 and arranged such that it contacts a front edge of the rear portion 140 of the bottom panel 110 to limit the rearward movement of the front portion 130 to a desired depth. While the linear actuator 280 is mounted diagonally with the pivoting connections to accommodate a length of the linear actuator 280, various other example embodiments may include a linear actuator that is mounted substantially parallel with the side walls 120.

Figure 7:
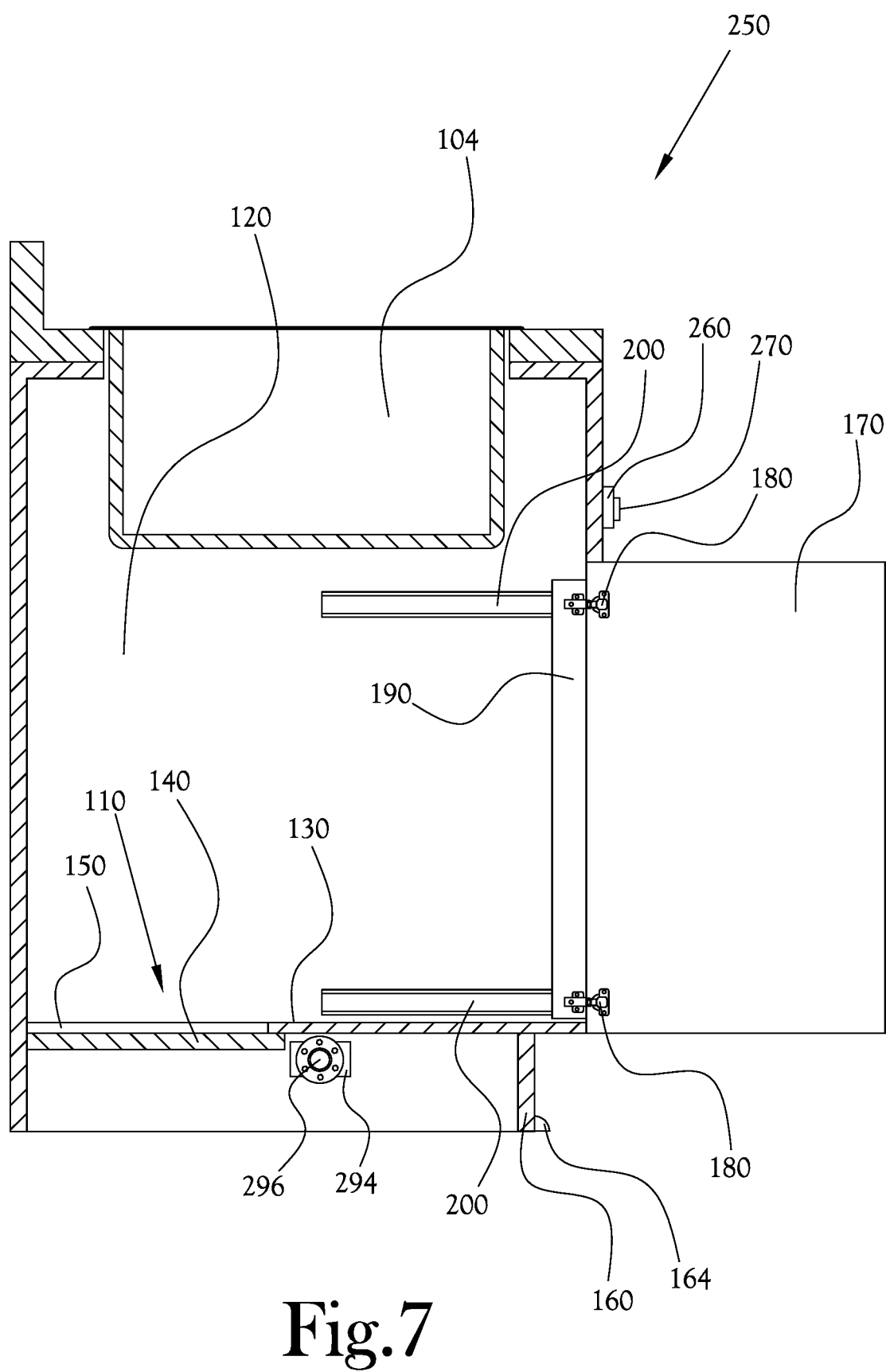
FIG. 7 illustrates a cross section of a cabinet system according to another example embodiment of the present general inventive concept.

In still other example embodiments a host of different electrical actuators, in a host of different configurations, may be used without departing from the scope of the present general inventive concept. For example, FIG. 7 illustrates a cross section of a cabinet system according to another example embodiment of the present general inventive concept. In FIG. 7, the cabinet system 250 is configured with much the same or similar componentry as the previously described example embodiments but is provided with an electrical actuator in the form of a rotary motor 294 configured to selectively drive a rotating wheel 296 that contacts a bottom surface of the front portion 130 of the bottom panel 110 do drive the front portion 130 back and forth. Such a rotary motor and wheel can be located at various other locations in various example embodiments of the present general inventive concept. For example, such an actuator could be located above the overlapping area of the front portion 130 and rear portion 140 to provide more range of movement of the front portion 130. In various example embodiments, the wheel 296 could directly contact the underside of the front portion 130 or could contact a track or other such differentiated surface provided on the underside of the front portion 130.

Various example embodiments of the present general inventive concept may provide a cabinet system in which the movable bottom panel, or movable portion of the bottom panel, may be moved outside of the cabinet system. FIGS. 8A-D illustrate perspective and front views of a cabinet system according to another example embodiment of the present general inventive concept, in which the cabinet system 300 includes a bottom panel 310 that is configured to be removably arranged between two side walls 320, so that a user can remove the bottom panel 310 to provide more room inside the cabinet space. Such a configuration may be especially convenient for people doing plumbing work under the sink 104 provided at a top of the cabinet system 300. As in the previously described example embodiments, the cabinet system includes a toe kick panel 335 connected to the bottom panel 310 so that the toe kick panel 335 stays in place relative to the bottom panel 310 when the bottom panel 310 is being moved. In various example embodiments the toe kick panel may be removably attached to the bottom panel 310, or configured to be pivoted upward for movement, and so on. A shoe molding strip 344 is attached to the bottom of the toe kick panel 335 and may itself be adjustable in various example embodiments of the present general inventive concept. A pair of doors 350 may be provided with wide angle hinges 354 such that the doors 350 swing out far enough to not interfere with the removal of the bottom panel 310 from the cabinet. In other example embodiments the doors may be arranged such that the bottom of the doors do not overlap with the bottom panel, so as to prevent interference when removing the bottom panel.

Figure 8A:
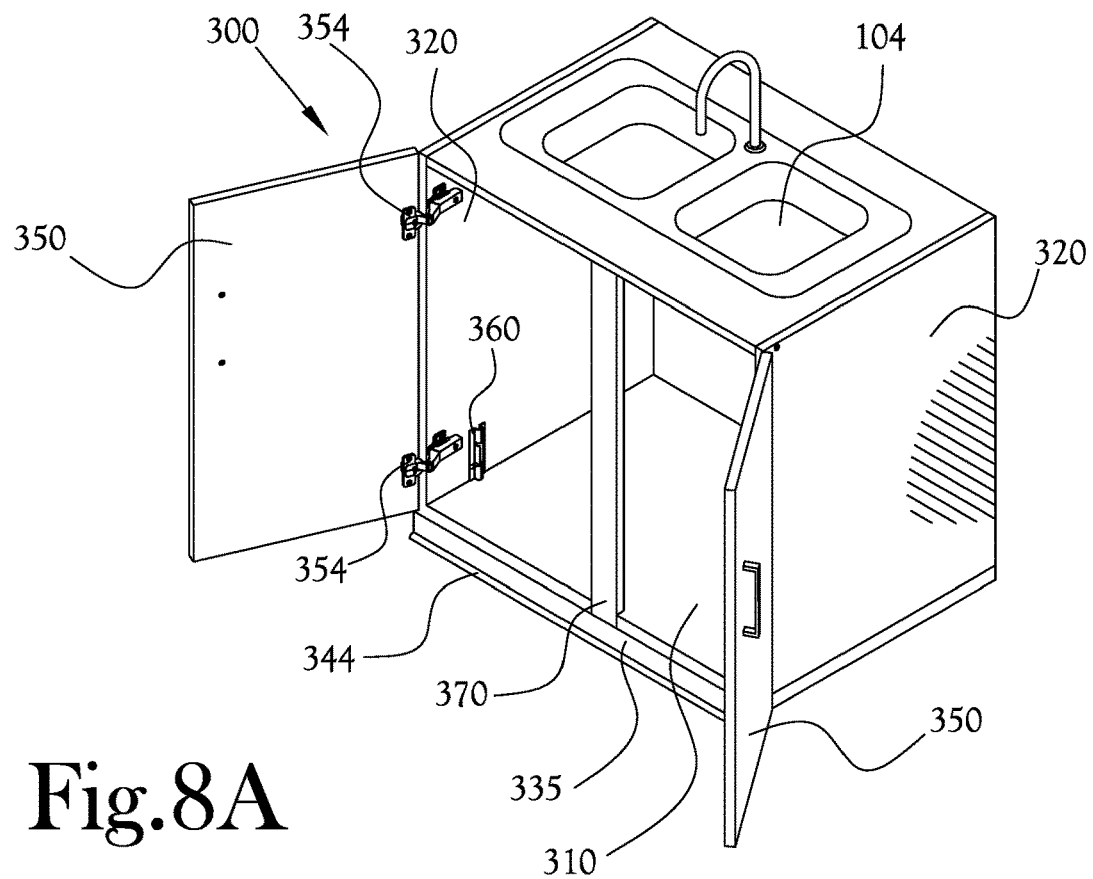
FIGS. 8A-D illustrate perspective and front views of a cabinet system according to another example embodiment of the present general inventive concept.
Figure 8B:
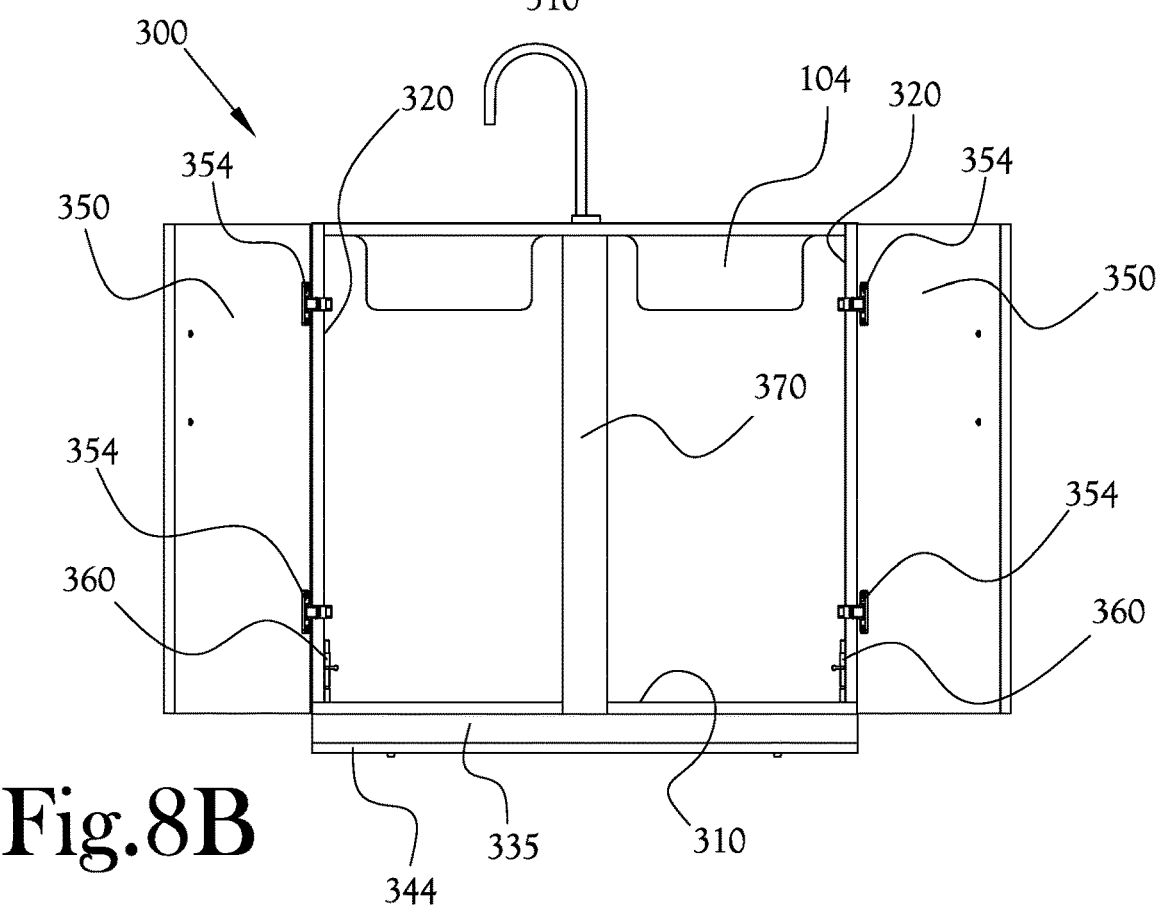
Figure 8C:
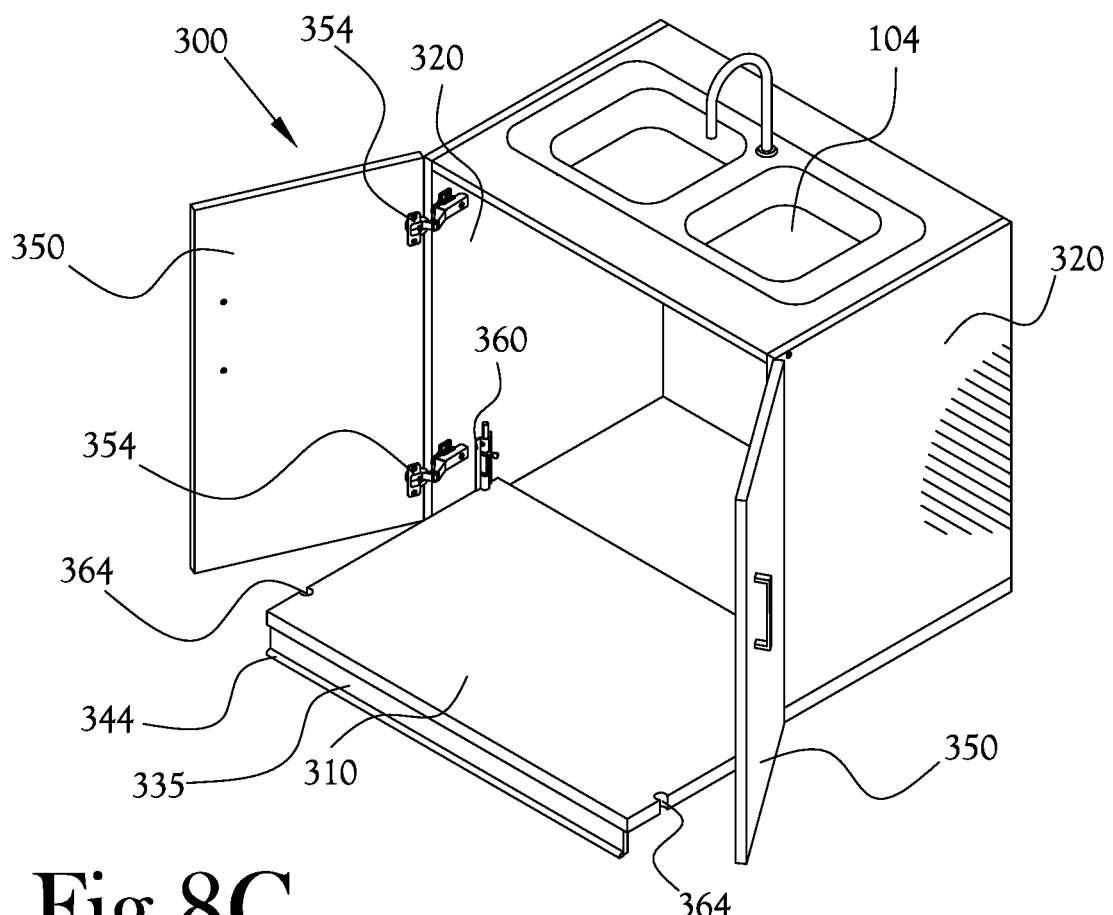
Figure 8D:
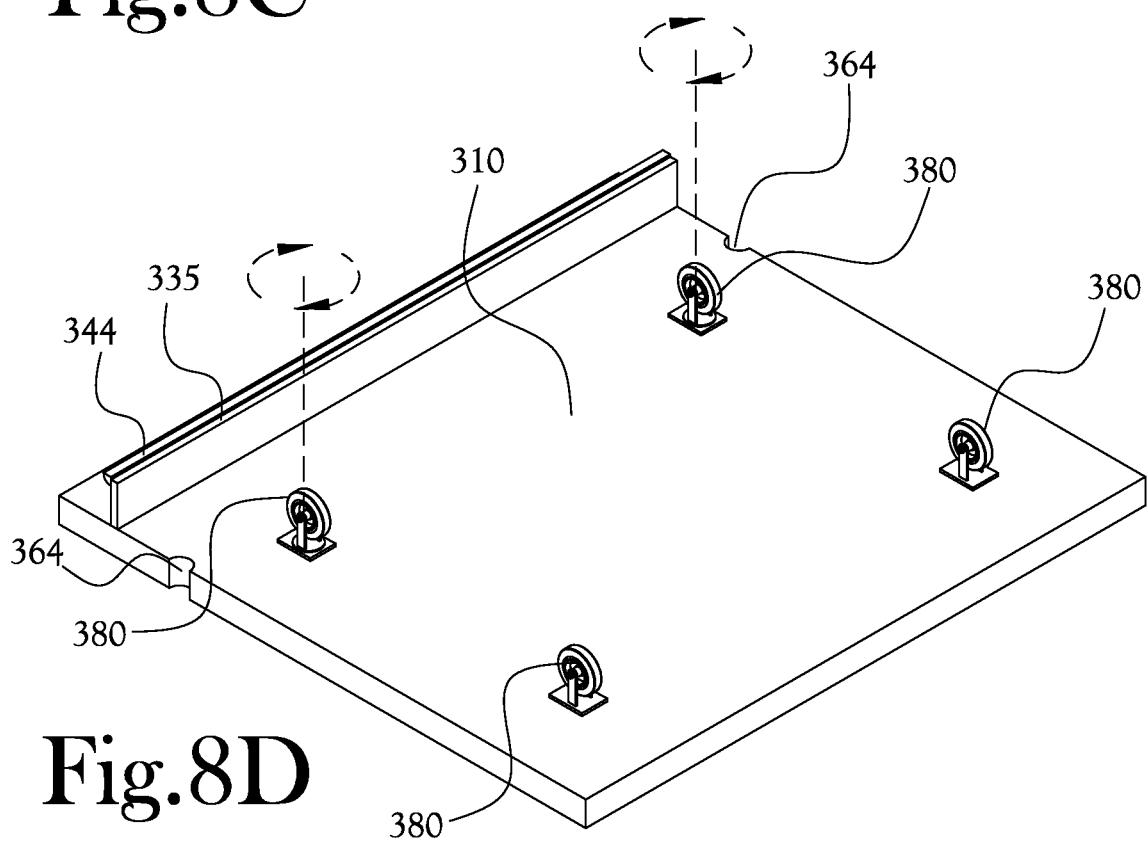

As illustrated in FIGS. 8A-B, a front brace 370 may be provided that is situated with, for example, a friction fit between the bottom panel 310 and an underside of the countertop so as to be easily removable when a user wants to take out the bottom panel 310. Such a front brace may actually provide a bracing function, may be merely cosmetic, may serve to fill in a gap between the doors 350 when closed, or may be omitted altogether in various example embodiments. The bottom panel 310 may be coupled to the side walls 320 by a latch system to keep the bottom panel 310 in place when inside the cabinetry. Various example embodiments may provide a host of different latch assemblies, and in this example embodiment a sliding latch bolt 360 is provided on each side wall 320 near a front edge of the side wall 320, and may be selectively slid into, and removed from, a corresponding notch 364 provided in the bottom panel 310. As illustrated in FIG. 8D, the bottom panel 310 may be configured with a plurality of wheels 380, which may be caster wheels, on the underside of the bottom panel 310 to enable easy and convenient movement of the bottom panel 310 into and out of the cabinet space of the cabinet system 300. In FIGS. 8A-B the cabinet doors 350 have been opened to access the interior of the cabinet space. In FIG. 8C the front brace 370 has been removed, the latch bolts 360 have been slid up and out of the notches 364, and the bottom panel 310 is partially moved outside of the cabinet space. The bottom panel 310 may be completely removed and rolled to another location while work is performed inside the cabinet space.

FIG. 8D illustrates an example embodiment of a caster wheel 380 configuration on a bottom surface of the bottom panel 310. In this example embodiment the notches 364 are formed through an entirety of the thickness of the bottom panel 310, but other configurations may be provided. Additionally, while FIGS. 8A-D illustrate an example embodiment in which the entirety of the bottom panel is configured to be removable, in various example embodiments only, discussed in greater detail below, a portion of the bottom panel may be configured to be removable.

For example, as illustrated in FIGS. 9A-B, the bottom panel may be configured such that only a front portion 330 of the bottom panel is selectively removable, while the rear portion 340 is stationary. In such example embodiments various latching assemblies, as discussed above, may be located at various locations proximate an edge of the movable portion of the bottom panel. Further, similar to the example embodiment discussed above, the front portion 330 may be configured with a plurality of wheels 380, which may be caster wheels, on the underside of the front portion 330 to enable easy and convenient movement of the front portion 330 into and out of the cabinet space of the cabinet system 300. In various example embodiments described herein elements of the cabinet system may be referred to a selectively removable, or detachable, and so on, which generally indicates that the elements may be moved or removed without cutting or otherwise altering the constituent elements of the system.

Various example embodiments of the present general inventive concept may provide various forms of smart controls for the retractable bottom panel, which may provide secondary controls for other cabinetry features. Such an example embodiment may let the operator actuate the powered features provided to one or more individual cabinets via wireless connectivity through an application on an information processing device such as a smartphone, tablet, etc., and/or with a centralized touchscreen interface controlling all of the cabinets.

In various example embodiments such power-able features may include actuation of doors and/or drawers, locking of doors and/or drawers, extending/retracting shelving, a powered appliance lift, controlling lighting in the cabinets, etc., or any combination of such features. Such smart control features may be optional in the various example embodiments of the present general inventive concept, and any and all such powered features may also be controlled by a hardwired dedicated interface accessible from, for example, the front side of each cabinet.

In example embodiments in which only local (proximate) control of the cabinets may be desired, the cabinets may be connected together via short-range wireless technology such as BLUETOOTH®. Each cabinet may have an individual BLUETOOTH® module, and one of the cabinets (or a separate master device) may act as the BLUETOOTH® hub. This would enable controlling a certain function of several cabinets at the same time. Such a configuration would be useful, for example, for turning the lighting on/off on all cabinets simultaneously, etc. Remote (distant) control of the cabinets may be achieved by adding a master Wi-Fi module to a cabinet (or by adding a separate master device) that also acts as the BLUETOOTH® hub. This "master" device may receive input over the local Wi-Fi network and relay the output to the cabinets via BLUETOOTH® or an equivalent wireless method. The apps on smartphones/tablets may be, for example, Android/iOS apps, open-source home automation software such as Home Assistant, or the like. The latter may work with a dedicated PC, which could also be used as the Wi-Fi/BLUETOOTH® hub. In such example embodiments as these described above, the two-way data transfer may be established to allow remote monitoring of actuator or lock status, to monitor whether a drawer or door has been opened, etc., which could be particularly useful for monitoring things such as, for example, medication access in an assisted living environment.

Thus, various example embodiments of the present general inventive concept provide wheelchair access under the kitchen sink, the sink base architecture having a fixed sink base with front doors and a partially retractable or removable cabinet floor to expose the actual floor space underneath. The front door or doors may be optionally mounted on sliding hinges to enable the doors to be slid inside the cabinet when in the open position, so as to facilitate better wheelchair access to the sink. Such sliding hinges are commonly available in the cabinet building industry. When the sink base doors are open and the moveable panel is in a retracted position, it creates a space for a person in a wheelchair to roll partially into the sink base, for comfortable access to the sink and tap. The retractable part of the cabinet floor or bottom panel, when in an extended position, may make up generally the "front half" of the bottom panel. The retractable portion may be made out of sheet metal and may slide in grooves formed in the interior of the sink base side walls or panels. In various example embodiments a fixed part of the cabinet floor or bottom panel may make up generally the "rear half" of the bottom panel. The retractable part may be positioned vertically higher than the fixed part, so the retractable portion can slide on top of the fixed portion of the bottom panel. A fixed or pivotable toe kick panel may be mounted on the retractable panel to move with the retractable panel. The sink base may be connected to an electrical power source, so that the retractable panel may be optionally moved by an electric actuator, with an operator interface mounted on the front of the sink base, or a hidden position inside the doors. In various example embodiments the cabinet system may include a face frame that can be attached in a removable manner to allow convenient changing of the visible front face of the cabinet, which may be particularly useful for installation locations that might be sensitive to the time required to renovate or repair cabinets, such as residential facilities or rental units.

Various example embodiments of the present general inventive concept may provide a cabinet system arranged to allow access to floor space underneath, the system including two side walls having front and rear edges, at least one door arranged proximate the front edges of the side walls and configured to be openable to access an area between the side walls; and a bottom panel arranged between the two side walls and configured such that at least a portion of the bottom panel is selectively movable to at least partially expose a floor space extending back from the front edges of the side walls. The system may further include a toe kick panel coupled to the movable portion of the bottom panel and configured such that the toe kick panel is moved when the movable portion of the bottom panel is moved. The system may further include one or more hinge members configured to couple the toe kick panel to the movable portion of the bottom panel such that the toe kick panel can be pivoted about the one or more hinge members to raise a bottom of the toe kick panel away from the floor space.

The system may further include a shoe molding strip detachably coupled proximate a bottom of the toe kick panel. The bottom panel may include a rear portion, and a front portion configured to be selectively movable relative to the rear section to at least partially expose the floor space extending back from the front edges of the side walls. The front portion of the bottom panel may be configured higher than the rear portion such that the front portion is movable over at least part of the rear portion. Each side of the front portion of the bottom panel may be slidably coupled to the respective side walls. The system may further include a guide groove formed on an inner surface of each of the side walls, each guide groove configured to receive a corresponding one of the sides of the front portion such that the front portion is selectively slidable between a first position to expose, and a second position to cover, the floor space extending back from the front edges of the side walls.

The system may further include at least one electric actuator fixed to a portion of the cabinet system so as to actuate movement of the front portion of the bottom panel. The at least one electric actuator may include a rotary motor with a rotating member proximate a bottom surface of the front portion of the bottom panel and configured to selectively drive the front portion toward and away from the front edges of the side walls. The at least one electric actuator may include a linear actuator configured to selectively drive the front portion toward and away from the front edges of the side walls. The system may further include a toe kick panel coupled to the front portion of the bottom panel such that the toe kick panel moves with the front portion, and one end of the linear actuator may be coupled to a back surface of the toe kick panel. The system may further include a user interface arranged proximate the front edges of the side walls and configured to control movement of the front portion of the bottom panel.

The system may further include a plurality of rolling members secured to an underside of, and configured to support, the movable portion of the bottom panel, and the movable portion of the bottom panel may be configured to be selectively movable outside the side walls to at least partially expose the floor space extending back from the front edges of the side walls. The movable portion of the bottom panel may be an entirety of the bottom panel. The rolling members may be configured as caster wheels. The system may further include at least one selectively releasable coupling member configured to couple the movable portion of the bottom panel to at least one of the side walls. The at least one selectively releasable coupling member may include a latching assembly provided proximate each side of the movable portion of the bottom panel, each latching assembly configured with a sliding bolt that is receivable in a corresponding notch in the proximate side of the movable portion. The at least one door may include a pair of doors that are configured to be selectively slid back into a position between the side walls when opened to a position substantially parallel to the side walls. The system may further include a front frame that may be configured to be coupled to the side walls so as to be selectively removable.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modifications, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A cabinet system adapted to allow access by a portion of a wheelchair to a floor space underneath, the cabinet system comprising:
two side walls having front and rear edges and defining the floor space therebetween;
at least one door arranged proximate the front edges of the side walls and configured to be openable to access an area between the side walls; and
a bottom panel arranged between the two side walls and configured with a rear portion fixed between the side walls and overlying a rearward portion of the floor space, and a front portion configured to be slidable along a planar surface thereof between a first position, in which the front portion overlies a forward portion of the floor space between the side walls and terminates between the front edges of the side walls, and a second position, in which the front portion is retracted into parallel-planar overlapping relationship above the rear and the forward portion of the floor space is configured to receive a portion of a wheelchair;
wherein the rear portion is configured to remain in place during movement of the front portion.

2. The cabinet system of claim 1, further comprising a toe kick panel coupled to the front portion of the bottom panel and extending between the two side walls from the front portion toward the floor space, the toe kick panel configured such that the toe kick panel slides along the floor space when the front portion of the bottom panel is slidably retracted from the first position to the second position.

3. The cabinet system of claim 1, wherein the front portion of the bottom panel is configured higher than the rear portion such that the front portion is slidable over at least part of the rear portion.

4. The cabinet system of claim 3, wherein each side of the front portion of the bottom panel is slidably coupled to the respective side walls.

5. The cabinet system of claim 4, further comprising a guide groove formed on an inner surface of each of the side walls, each guide groove configured to receive a corresponding one of the sides of the front portion such that the front portion is selectively slidable between a first position to expose, and a second position to cover, the floor space extending back from the front edges of the side walls.

6. The cabinet system of claim 1, further comprising at least one actuator fixed to a portion of the cabinet system so as to actuate movement of the front portion of the bottom panel.

7. The cabinet system of claim 6, wherein the at least one actuator is an electric actuator comprising a rotary motor with a rotating member proximate a bottom surface of the front portion of the bottom panel and configured to selectively drive the front portion toward and away from the front edges of the side walls.

8. The cabinet system of claim 6, wherein the at least one actuator comprises a linear actuator configured to selectively drive the front portion toward and away from the front edges of the side walls.

9. The cabinet system of claim 8, further comprising a toe kick panel coupled to the front portion of the bottom panel such that the toe kick panel slides along the floor portion when the front portion is slidably retracted; and
wherein one end of the linear actuator is coupled to a back surface of the toe kick panel.

10. The cabinet system of claim 6, further comprising a user interface arranged proximate the front edges of the side walls and configured to control movement of the front portion of the bottom panel.

11. The cabinet system of claim 1, wherein the at least one door comprises a pair of doors that are configured to be selectively slid back into a position between the side walls when opened to a position substantially parallel to the side walls.

12. The cabinet system of claim 1, further comprising a front frame configured to be coupled to the side walls so as to be selectively removable.

13. The cabinet system of claim 1, wherein the front portion of the bottom panel is adapted to hold stored items, and wherein the front portion is configured such that stored items remain on the front portion when the front portion is retracted.

14. A cabinet system adapted to receive a portion of a wheelchair over a floor space underneath the cabinet system, the cabinet system comprising:
two side walls having front and rear edges, the floor space extending between the side walls and terminating along a first line between the front edges of the side walls and along a second line between the rear edges of the side walls;
at least one door arranged proximate the front edges of the side walls and configured to be openable to access an area between the side walls; and
a bottom panel arranged between the two side walls, the bottom panel being configured with a rear portion extending between the side walls and overlying a rearward portion of the floor space, and a front portion configured to be slidable relative to the rear portion along a planar surface of the front portion between a closed state and an open state, wherein when the front portion is in the closed state the front portion extends between the side walls to overlie a forward portion of the floor space and terminates along the first line, and wherein when the front portion is in the open state the front portion is slidably retracted in parallel-planar overlapping configuration above the rear portion such that the cabinet system is configured to receive a portion of a wheelchair over the forward portion of the floor space extending back from the front edges of the side walls;
wherein the rear portion is configured to remain in place, and the front portion is configured to maintain a substantially horizontal arrangement throughout movement between the closed state and the open state.

15. The cabinet system of claim 14, wherein the front portion of the bottom panel is adapted to hold stored items, and wherein the front portion is configured such that stored items remain on the front portion when the front portion is moved from the closed state to the open state.

* * * * *